(12) United States Patent
Hetzner et al.

(10) Patent No.: US 7,578,335 B2
(45) Date of Patent: Aug. 25, 2009

(54) POWDER METAL MOLD CASTING FOR THREE DIMENSIONAL PARTS

(75) Inventors: James E. Hetzner, Saginaw, MI (US); Frederick J. Rozario, Fenton, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 61 days.

(21) Appl. No.: 10/924,498

(22) Filed: Aug. 24, 2004

(65) Prior Publication Data

US 2006/0042769 A1    Mar. 2, 2006

(51) Int. Cl.
*B22C 1/00* (2006.01)
*B22C 9/00* (2006.01)

(52) U.S. Cl. .................. 164/4.1; 164/15; 164/529
(58) Field of Classification Search ................ 164/4.1, 164/34, 35, 15, 529, 45
See application file for complete search history.

(56) References Cited

U.S. PATENT DOCUMENTS

| 4,575,330 A | 3/1986 | Hull |
| 5,088,047 A | 2/1992 | Bynum |
| 2004/0140078 A1* | 7/2004 | Liu et al. ................ 164/34 |

* cited by examiner

*Primary Examiner*—Kevin P Kerns
(74) *Attorney, Agent, or Firm*—Fraser Clemens Martin & Miller LLC; J. Douglas Miller

(57) ABSTRACT

A process for powder metal mold casting of three-dimensional parts is disclosed wherein a casting of complex parts is facilitated.

19 Claims, 3 Drawing Sheets

POWDER METAL MOLD CASTING FOR THREE DIMENSIONAL PARTS

FIELD OF THE INVENTION

The invention relates to mold casting and more particularly to a process for powder metal mold casting of three-dimensional parts.

BACKGROUND OF THE INVENTION

It is common practice in the production of a part to first design the part and then produce a prototype of the part. The prototyping process involves a considerable amount of time, effort and expense. Once a prototype has been produced, the design is evaluated. The process is then repeated until the design has been optimized.

Once a design has been optimized, the next step is production. Many production parts are molded or cast. Since the design time and tooling costs for the parts are typically very high, the production of the parts are usually only practical when produced in a high volume.

There exists a need in the design and production arts for the capability of rapidly and reliably moving from the design stage to the prototype stage and ultimately to production. The ability to move directly from computer designs for such parts to virtually immediate prototypes and large scale production has economic benefits as well.

Computer aided design (CAD) advancements have helped in reducing the time required for proceeding from the prototype phase to the production phase. CAD systems allow for efficient study and manipulation of a design.

It would be desirable to develop a process for prototyping and production of parts or castings wherein a time required is minimized and efficiency is maximized.

SUMMARY OF THE INVENTION

Consistent and consonant with the present invention, a process for prototyping and production parts or castings wherein a time required is minimized and efficiency is maximized, has surprisingly been discovered.

In one embodiment, a process for mold casting of a three-dimensional part comprises the steps of providing a computer data file representing a mold having a mold cavity formed therein for the three-dimensional part and a gating system for directing a molten metal to the cavity; printing the mold in a plurality of layers with a mold forming material; supplying the molten metal to the cavity of the mold through the gating system; cooling the molten metal to form a casting of the three-dimensional part; and removing the mold from the casting.

In another embodiment, a process for powder metal mold casting of a three-dimensional part comprises the steps of a data preparation phase comprising providing a computer data file representing a mold having a cavity formed therein for a three-dimensional part and a gating system for directing a molten metal to the cavity; a molding and pouring phase comprising printing the mold in a plurality of layers with a powdered metal, supplying the molten metal to the cavity of the mold through the gating system, and cooling the molten metal to form a casting of the three-dimensional part; and a knockout and finishing phase comprising breaking away the powdered metal mold from the casting.

In another embodiment, a process for powder metal mold casting of a three-dimensional part comprises the steps of providing a computer data file representing the three-dimensional part and a gating system; providing a computer data file representing a three-dimensional solid mold having a volume which is large enough to encompass the three-dimensional part and the gating system; creating a computer data file by comparing and manipulating data in the computer data file representing the total volume of the three-dimensional part and the gating system to data contained in the computer data file representing the solid mold to result in a computer data file representing a mold having a mold cavity formed therein of the three-dimensional part and the gating system for directing a molten metal to the cavity; printing the mold in a plurality of layers with a powdered metal; supplying the molten metal to the cavity of the mold through the gating system; cooling the molten metal to form a casting of the three-dimensional part; and breaking away the powdered metal mold from the casting.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THE PREFERRED EMBODIMENT

The following detailed description and appended drawings describe and illustrate various exemplary embodiments of the invention. The description and drawings serve to enable one skilled in the art to make and use the invention, and are not intended to limit the scope of the invention in any manner. In respect of the process disclosed and the flow diagrams illustrated, the steps presented are exemplary in nature, and thus, the order of the steps is not necessary or critical.

Figure 1:
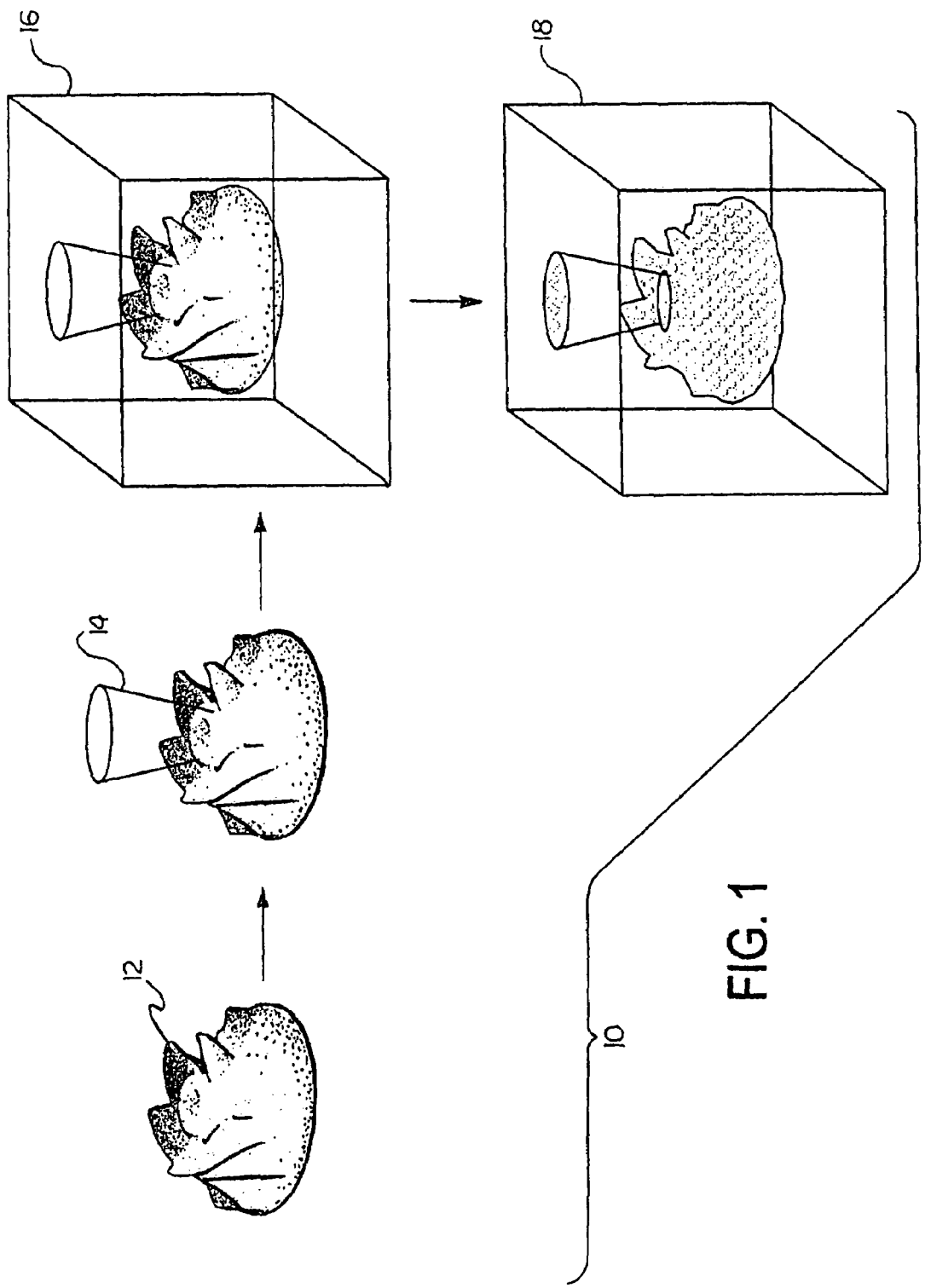
FIG. 1 is a schematic flow diagram showing a data preparation phase of a process for powder metal mold casting of three dimensional parts according to an embodiment of the invention.

FIG. 1 depicts a flow diagram showing a data preparation phase 10 of a process for powder metal mold casting of three dimensional parts according to an embodiment of the invention. The data preparation phase 10 includes a step of assembling the data representing a three-dimensional part 12. The data typically includes coordinate information sufficient to represent a three-dimensional model of the part. A computer aided design (CAD) package is typically used for assembling the data representing a three-dimensional part 12 as is well known in the art.

Once the step of assembling the data representing a three-dimensional part 12 is completed, assembly of data representing a gating system for the part 14 is conducted and added to the data representing the three-dimensional part. The gating system directs a molten metal into a mold cavity formed in a mold to create the desired three-dimensional part. The data for the gating system represents a gating system location determined according to conventional gating system location techniques for casting of metal parts. The gating system location is determined to facilitate proper filling of the mold cavity during a pouring operation.

Data is now assembled representing a three-dimensional solid mold having a volume which is large enough to encompass the total volume of the three-dimensional part and the gating system. The data representing the total volume of the three-dimensional part and the gating system is compared to the data file for the mold 16. The volume of the three-dimensional part and the gating system is manipulated or subtracted from the volume of the solid mold. In the embodiment shown, the mold shape is a cube. However, it is understood that other shapes such as an irregular shape, for example, can be used to form the mold without departing from the scope and spirit of the invention.

The result of the comparison and manipulation of the data representing the total volume of the three-dimensional part and the gating system with the data file for the mold is a new set of data representing a compliment or a mold having a cavity formed therein for the three-dimensional part and the gating system 18. The gating system provides communication between an outside environment and a cavity representing the part inside the mold. The data representing the mold having a cavity formed therein for the three-dimensional part and the gating system 18 is stored in a computer file, typically a CAD computer file. A typical file format for the data representing the mold having a cavity formed therein for the three-dimensional part and the gating system 18 is .stl format, although it is understood that other file formats can be used.

Figure 2:
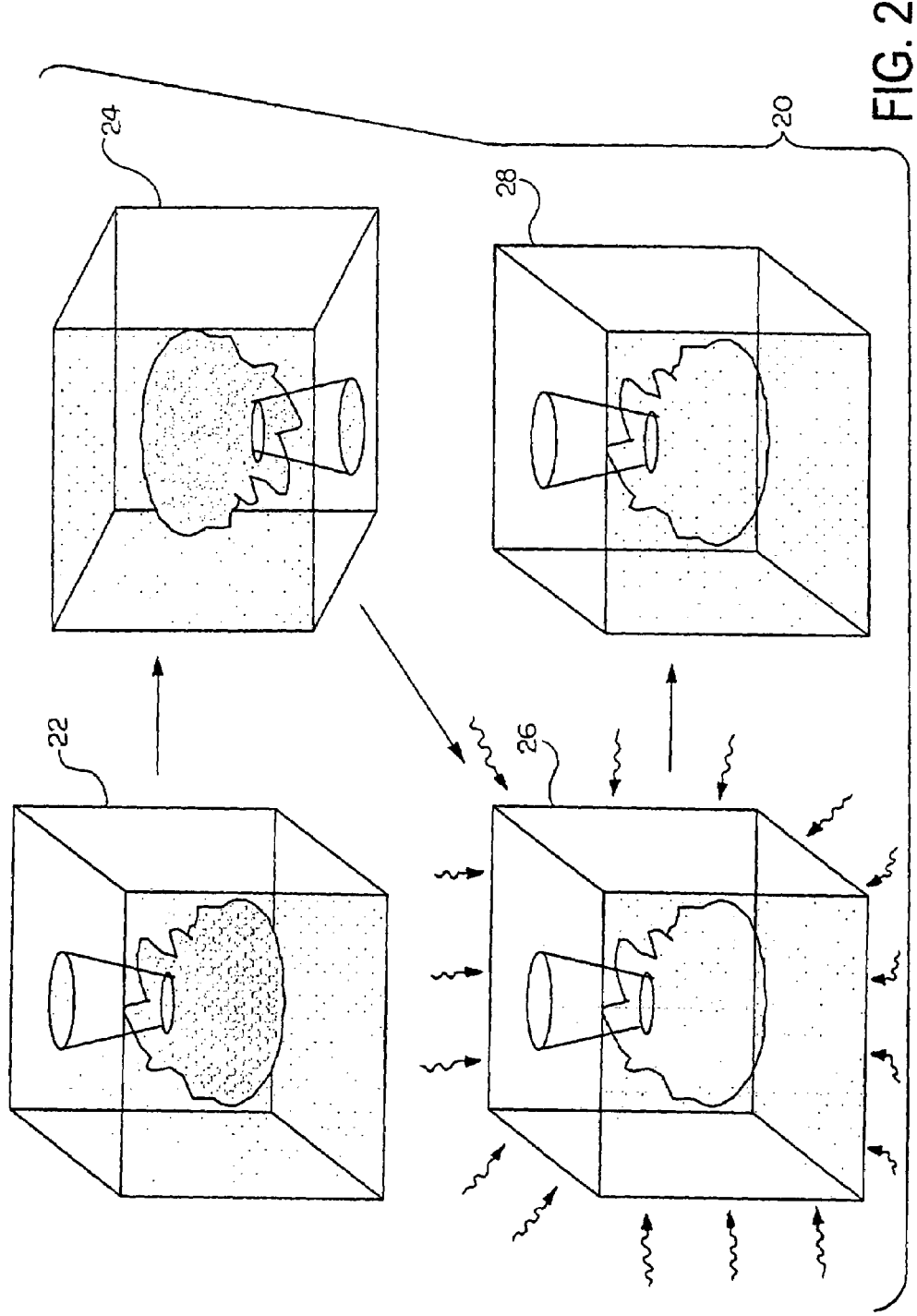
FIG. 2 is a schematic flow diagram showing a molding and pouring phase of a process for powder metal mold casting of three dimensional parts according to an embodiment of the invention.

The file for the data representing the mold having a cavity formed therein for the three-dimensional part and the gating system 18 is used in a molding and pouring phase 20 illustrated in FIG. 2. Once the data representing the mold having a cavity formed therein for the three-dimensional part and the gating system 18 has been created and stored in the computer file, a printing of the mold 22 is conducted using an inkjet printing system. The inkjet printing system is used to print the mold layer by layer using a mold forming material. Any conventional mold forming material can be used such as stainless steel powder and other powdered metals, for example. A binder material mixed with the mold forming material may be used to aid in the retention of the shape of the mold during and after the printing thereof. The resulting printed mold will be a three-dimensional mold with a mold cavity formed therein representing the shape of the three-dimensional part and the gate communicating with the mold cavity. As show in FIG. 2, the mold 22 having the mold cavity formed therein and the gating system 18 are integrally formed. After printing, the mold is allowed to cure.

After printing and curing, the mold is inverted to allow any uncured mold forming material to be removed 24. The inverted mold may be shaken to assist in the removal of the uncured mold forming material. Additionally, other removal aids can be used to remove the uncured mold forming material such a vacuum, for example.

Treatment of the mold 26 is conducted to create a sufficient bond in the mold to facilitate a handling thereof and maximize the casting strength of the mold. In the embodiment described herein, sintering is used wherein the mold is thermally treated to a point below the melting point of the mold forming material, thus resulting in a metallurgical bonding of the particles of the mold forming material.

Once the mold has been printed, cured, and treated as desired, molten metal is poured into the gating system 28 to fill the cavity formed in the mold. To facilitate the metal pouring step 28, a vacuum can be created around the mold. Additionally, to control a cooling or metallic properties of the metals being poured, the mold can be pre-heated or pre-cooled as desired.

Figure 3:
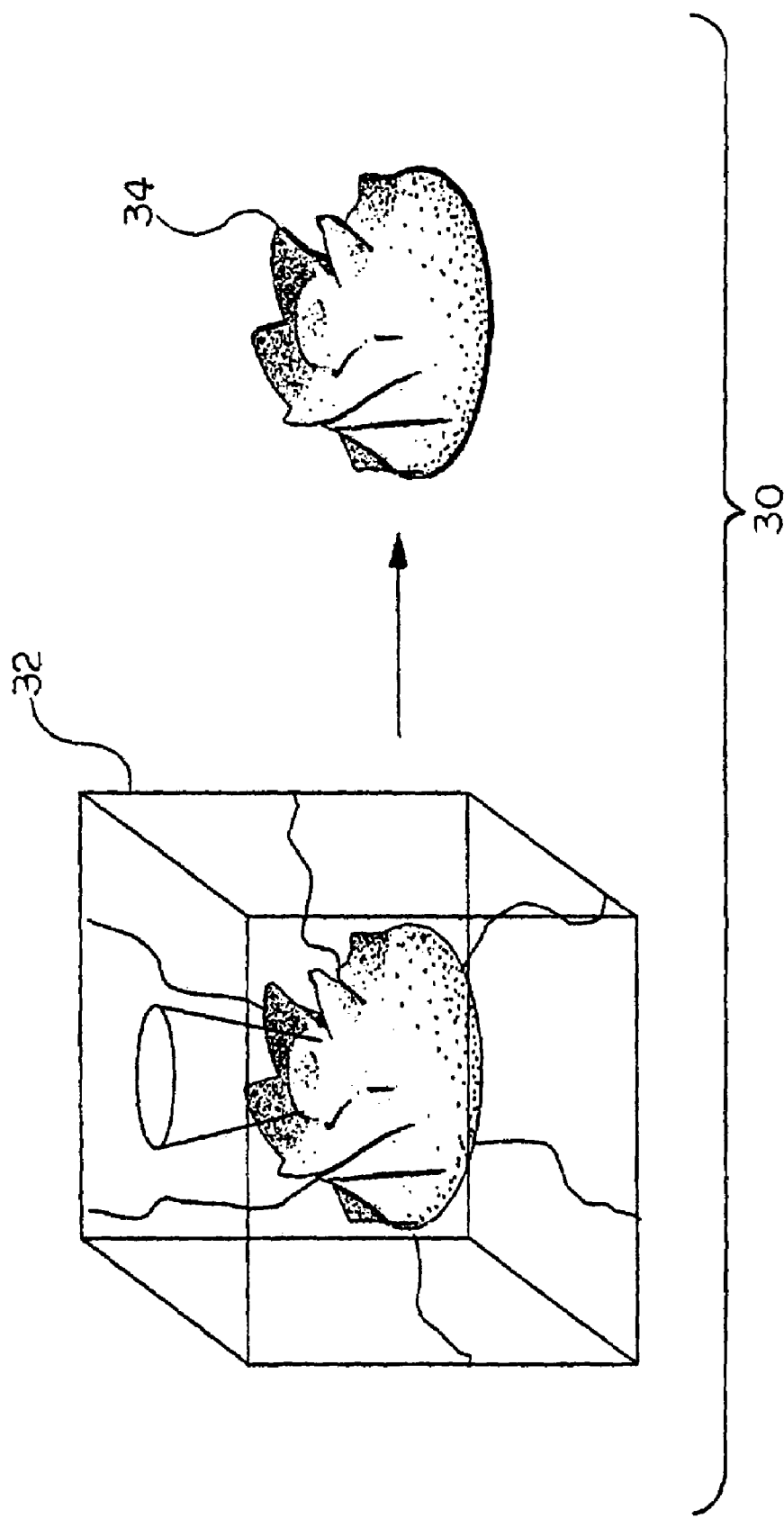
FIG. 3 is a schematic flow diagram showing a knockout and finishing phase of a process for powder metal mold casting of three dimensional parts according to an embodiment of the invention.

Once the molded part has been allowed to cool and harden, a knockout and finishing phase 30 as illustrated in FIG. 3 can begin. The mold is removed or broken away 32 to reveal a three-dimensional casting. The higher strength three-dimensional casting remains after the lower strength mold is broken away. Residual mold materials remaining on the casting can be removed by any conventional means such as vibrating, shaking, soaking, pressurized air, or vacuum as desired.

After the mold has been removed from the three-dimensional casting, machining of the casting 34 can be conducted as desired to result in the final shape of the part. Additional heat treating operations, coating processes, and like can also be conducted on the casting. The broken away mold material could be reused as desired to create new molds for additional three-dimensional parts.

Although the process described herein can be used for any three-dimensional shape, it has been found to be useful in the creation of complex three-dimensional shapes. Complex shapes often do not lend themselves to production by known casting techniques as the finished part may be trapped in a conventional mold resulting in undesirable damage to either the mold or the cast part. It is now feasible to produce the parts having complex three-dimensional shapes in higher volumes.

The process described herein has also been found to be useful for the production of prototype parts. Once the data representing the mold has been created, the mold is then printed. If changes are required, the data can easily be changed and a new mold printed. Using prior art methods, the creation of a mold is time consuming as drawings must be created and the mold machined from the desired mold forming material. Any changes to a mold require additional machining or require a new mold to be machined from the mold forming material. CAD data is easily changed, and the use thereof facilitates a bypassing of tooling design or mold design and the production thereof. An efficiency for the prototyping process is maximized and a cost of the prototype is minimized.

The present invention also maximizes a flexibility of a production line as the production line can easily be converted from one part to another. To change from one part to a new part, a different data file is sent to the printer for the new part and the mold for the new part is printed.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A process for mold casting of a three-dimensional part comprising the steps of:
   providing a computer data file representing a mold having a mold cavity formed therein for the three-dimensional part and a gating system in fluid communication with the mold cavity (18);
   printing the mold from the computer data file in a plurality of layers with a mold forming material (22), wherein the mold having the mold cavity formed therein and the gating system are integrally formed by the mold forming material;
   supplying a molten metal to the mold cavity of the mold through the gating system (28);
   cooling the molten metal in the mold cavity to form a casting of the three-dimensional part; and
   removing the mold from the casting (32).

2. The process according to claim 1, wherein the computer data file provided is a computer aided design file.

3. The process according to claim 1, further comprising the steps of providing a computer data file representing the three-dimensional part (12) and the gating system (14), and providing a computer data file representing a three-dimensional solid mold having a volume which is large enough to encompass the three-dimensional part and the gating system.

4. The process according to claim 3, further comprising the step of creating a computer data file by manipulating data in the computer data file representing the total volume of the three-dimensional part, the gating system, and data contained in the computer data file representing the solid mold (16) to result in the computer data file representing the mold (18).

5. The process according to claim 1, wherein the mold is removed from the casting by breaking away the mold (32).

6. The process according to claim 1, wherein the mold forming material is a powdered metal.

7. The process according to claim 6, wherein the mold forming material is stainless steel.

8. The process according to claim 1, further comprising the step of sintering the printed mold (26).

9. The process according to claim 1, further comprising the step of inverting the printed mold to remove loose excess mold forming material from the cavity of the mold (24).

10. A process for powdered metal mold casting of a three-dimensional part comprising the steps of:
a data preparation phase (10) comprising providing a computer data file representing a mold having a cavity formed therein for a three-dimensional part and a gating system in fluid communication with the cavity (18), wherein the mold having the mold cavity formed therein and the gating system are integrally formed by the mold forming material;
a molding and pouring phase (20) comprising printing the mold from the computer data file in a plurality of layers with the powdered metal (22), supplying a molten metal to the cavity of the mold through the gating system (28), and cooling the molten metal in the cavity to form a casting of the three-dimensional part; and
a knockout and finishing phase (30) comprising breaking away the powdered metal mold from the casting (32).

11. The process according to claim 10, wherein the computer data file provided is a computer aided design file.

12. The process according to claim 10, further comprising the steps of providing a computer data file representing the three-dimensional part and the gating system (14), and providing a computer data file representing a three-dimensional solid mold having a volume which is large enough to encompass the three-dimensional part and the gating system.

13. The process according to claim 12, further comprising the step of creating a computer data file by manipulating data in the computer data file representing the total volume of the three-dimensional part, the gating system, and data contained in the computer data file representing the solid mold (16) to result in the computer data file representing the mold (18).

14. The process according to claim 10, wherein the powdered metal is stainless steel.

15. The process according to claim 10, further comprising the step of sintering the printed mold (26).

16. A process for powdered metal mold casting of a three-dimensional part comprising the steps of:
providing a computer data file representing the three-dimensional part (12) and a gating system (14);
providing a computer data file representing a three-dimensional solid mold having a volume which is large enough to encompass the three-dimensional part and the gating system;
creating a computer data file by comparing and manipulating data in the computer data file representing the total volume of the three-dimensional part, the gating system, and data contained in the computer data file representing the solid mold (16) to result in a computer data file representing a mold having a mold cavity formed therein of the three-dimensional part and the gating system in fluid communication with the cavity (18);
printing the mold from the computer data file in a plurality of layers with a powdered metal (22), wherein the mold having the mold cavity formed therein and the gating system are integrally formed by the mold forming material;
supplying a molten metal to the mold cavity of the mold through the gating system (28);
cooling the molten metal in the mold cavity to form a casting of the three-dimensional part; and
breaking away the powdered metal mold from the casting (32).

17. The process according to claim 16, wherein the computer data files are computer aided design files.

18. The process according to claim 16, wherein the powdered metal is stainless steel.

19. The process according to claim 16, further comprising the step of sintering the printed mold (26).

* * * * *